(12) United States Patent
de Heer et al.

(10) Patent No.: US 8,054,842 B2
(45) Date of Patent: Nov. 8, 2011

(54) APPARATUS FOR PROVIDING INTERNET PROTOCOL TELEVISION SERVICE AND INTERNET SERVICE

(75) Inventors: Arjan de Heer, Hengelo (NL); Stephan Roullot, L'Hay-les-Roses (FR); Angel Molina, Erlangen (DE); Felix Hueppauff, Nuremberg (DE)

(73) Assignee: Alcatel Lucent, Paris (FR)

( * ) Notice: Subject to any disclaimer, the term of this patent is extended or adjusted under 35 U.S.C. 154(b) by 1253 days.

(21) Appl. No.: 11/263,561

(22) Filed: Oct. 31, 2005

(65) Prior Publication Data

US 2007/0097639 A1     May 3, 2007

(51) Int. Cl.
H04L 12/28 (2006.01)
(52) U.S. Cl. .............................................. 370/401
(58) Field of Classification Search ................ None
See application file for complete search history.

(56) References Cited

U.S. PATENT DOCUMENTS

| | | | |
|---|---|---|---|
| 6,088,356 A * | 7/2000 | Hendel et al. | 370/392 |
| 6,507,870 B1 * | 1/2003 | Yokell et al. | 709/225 |
| 6,763,017 B1 * | 7/2004 | Buckingham et al. | 370/352 |
| 7,145,906 B2 * | 12/2006 | Fenner | 370/392 |
| 7,165,131 B2 * | 1/2007 | Creta et al. | 710/100 |
| 7,170,871 B2 * | 1/2007 | Eyuboglu et al. | 370/331 |
| 7,483,450 B1 * | 1/2009 | Giese et al. | 370/507 |
| 7,558,240 B2 * | 7/2009 | Chen et al. | 370/338 |
| 7,577,137 B2 * | 8/2009 | Melsen et al. | 370/389 |
| 7,720,001 B2 * | 5/2010 | Baird et al. | 370/253 |
| 7,764,700 B2 * | 7/2010 | Muirhead et al. | 370/401 |
| 7,830,879 B2 * | 11/2010 | Hamilton et al. | 370/390 |
| 2002/0101874 A1 * | 8/2002 | Whittaker et al. | 370/402 |
| 2003/0231635 A1 * | 12/2003 | Kalkunte et al. | 370/395.42 |
| 2004/0131357 A1 * | 7/2004 | Farmer et al. | 398/67 |
| 2005/0141539 A1 * | 6/2005 | Hamilton et al. | 370/432 |
| 2005/0201406 A1 * | 9/2005 | Sekine et al. | 370/432 |
| 2005/0243710 A1 * | 11/2005 | Christensen et al. | 370/216 |
| 2005/0289623 A1 * | 12/2005 | Midani et al. | 725/100 |
| 2006/0182109 A1 * | 8/2006 | Melsen et al. | 370/390 |
| 2006/0184989 A1 * | 8/2006 | Slothouber | 725/110 |

(Continued)

FOREIGN PATENT DOCUMENTS

CA     2 321 805 A1     3/2002

(Continued)

OTHER PUBLICATIONS

International Search Report & Written Opinion in corresponding PCT/US2006/040688, Apr. 18, 2007, Lucent Technologies Inc.

(Continued)

*Primary Examiner* — Ayaz Sheikh
*Assistant Examiner* — Timothy J Weidner
(74) *Attorney, Agent, or Firm* — Wall & Tong, LLP

(57) ABSTRACT

A system for transporting downstream and upstream traffic between service providers and end user terminals is provided. The system may include an apparatus having multiple egress ports configured for transmitting downstream traffic received from the service providers towards nodes adapted for replicating the traffic, at one network layer, and further transmitting the replicated traffic toward the end user terminals. The system may further include a merging unit coupled to ingress port of another apparatus receiving upstream traffic from the user end terminals, where the merging unit is adapted for merging the upstream traffic, at a different network layer, according to which service provider the upstream traffic received from the end user terminals is intended to and for transmitting the merged traffic toward the service providers.

24 Claims, 5 Drawing Sheets

U.S. PATENT DOCUMENTS

| | | | |
|---|---|---|---|
| 2007/0061830 A1* | 3/2007 | Chang | 725/9 |
| 2007/0061831 A1* | 3/2007 | Savoor et al. | 725/13 |
| 2007/0074245 A1* | 3/2007 | Nyako et al. | 725/34 |
| 2007/0074258 A1* | 3/2007 | Wood et al. | 725/105 |
| 2007/0081537 A1* | 4/2007 | Wheelock | 370/392 |
| 2007/0083907 A1* | 4/2007 | Serbest et al. | 725/112 |
| 2007/0133558 A1* | 6/2007 | Wu | 370/395.5 |
| 2007/0206773 A1* | 9/2007 | Branam | 379/265.09 |
| 2008/0189754 A1* | 8/2008 | Yoon et al. | 725/105 |
| 2009/0190584 A1* | 7/2009 | Gemmer et al. | 370/390 |
| 2009/0225782 A1* | 9/2009 | Oh et al. | 370/474 |
| 2010/0049856 A1* | 2/2010 | Wright et al. | 709/227 |
| 2010/0054263 A1* | 3/2010 | Ramaswami et al. | 370/400 |
| 2010/0103837 A1* | 4/2010 | Jungck et al. | 370/252 |

FOREIGN PATENT DOCUMENTS

| | | |
|---|---|---|
| EP | 1 548 964 A | 6/2005 |
| JP | 2002-124941 | 4/2002 |
| JP | 2002-232476 | 8/2002 |
| JP | 2003-324432 | 11/2003 |
| JP | 2005-192213 | 7/2005 |
| WO | WO/2004/043019 | 5/2004 |

OTHER PUBLICATIONS

Office Action Japanese Patent Application No. 2008-537776, Alcatel-Lucent USA Inc., Applicant, mailed Mar. 1, 2011, 3 pages.

* cited by examiner

100

200

300

400

500

APPARATUS FOR PROVIDING INTERNET PROTOCOL TELEVISION SERVICE AND INTERNET SERVICE

FIELD OF THE INVENTION

The invention relates to the field of communication networks and, more specifically, to networks supporting Internet Protocol (IP) television service and Internet access service.

BACKGROUND OF THE INVENTION

As networks continue to evolve, many network operators are deploying infrastructure for supporting both Internet Protocol (IP) television (TV) service and Internet access service. In general, a network supporting both IP TV and Internet access requires a unidirectional connection for broadcasting IP TV data from an IP TV service provider to a DSLAM serving the associated end users, and a bidirectional connection from the DSLAM serving the end user to the IP point-of-presence (POP) for the Internet access service. Alternatively, rather than a bidirectional connection for the Internet access service, the Internet access service may be provided using a multicast connection which provides both the IP TV service and the Internet access service.

In such a configuration, the network includes one multicast connection from each service provider to the DSLAMs and one unicast connection from each DSLAM to each service provider. In other words, the network must support multicast connectivity from the service providers to the DSLAMs and unicast connectivity from DSLAMs to the service providers. In existing configurations, an Ethernet network is used for interconnecting the service providers and the DSLAMS which serve the associated end users.

In one configuration, an Ethernet switch interconnects the service providers and the DSLAMS such that there is a bidirectional connection between each service provider and the Ethernet switch and a bidirectional connection between the Ethernet switch and each DSLAM for each service provider. In such a configuration, different service providers may share a connection using an Ethernet-based virtual local area network (VLAN). Disadvantageously, this configuration requires replication of the multicast IP TV service traffic at the Ethernet switch, thereby resulting in network bandwidth inefficiency when replicated Ethernet frames follow the same path through the network.

In another configuration, Ethernet frame replication may be performed further downstream by deploying additional Ethernet switches between the Ethernet switch associated with the service providers and the DSLAMs associated with the end users, thereby eliminating network bandwidth inefficiency. Disadvantageously, however, this configuration requires additional Ethernet switching capacity and may require use of the Spanning Tree Protocol for protection. In one such configuration, the additional Ethernet switches may be deployed for aggregating the traffic of the DSLAMs (i.e., a hub-and-spoke configuration in which the hub Ethernet switch is directly connected to the service providers and the spoke Ethernet switches are directly connected to the DSLAMs). Although this configuration does not require use of Spanning Tree Protocol, disadvantageously, this configuration does not eliminate the bandwidth inefficiency.

SUMMARY OF THE INVENTION

Various deficiencies in the prior art are addressed through the invention of system for transporting type one traffic downstream from a service provider router to end user terminals by replicating the type one traffic at a first network layer and transporting type two traffic upstream from the end user terminals to the service provider router by merging the type two traffic at a second network layer, where the first and second network layers are different.

One apparatus according to the present invention includes a plurality of unidirectional egress ports configurable for transmitting type one traffic towards a plurality of type one nodes adapted for replicating the type one configurable for receiving type two traffic, and a merging unit coupled to the plurality of unidirectional ingress ports, wherein the merging unit is adapted for merging the type two traffic at a second network layer, wherein the first network layer and the second network layer are different.

One apparatus according to the present invention includes a plurality of first bidirectional ports, each of the first bidirectional ports configurable for broadcasting type one traffic towards a plurality of type one nodes adapted for replicating the type one traffic at a first network layer, each of the first bidirectional ports configurable for receiving type two traffic from a type two node adapted for merging the type two traffic at a second network layer, wherein the first network layer and the second network layer are different.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
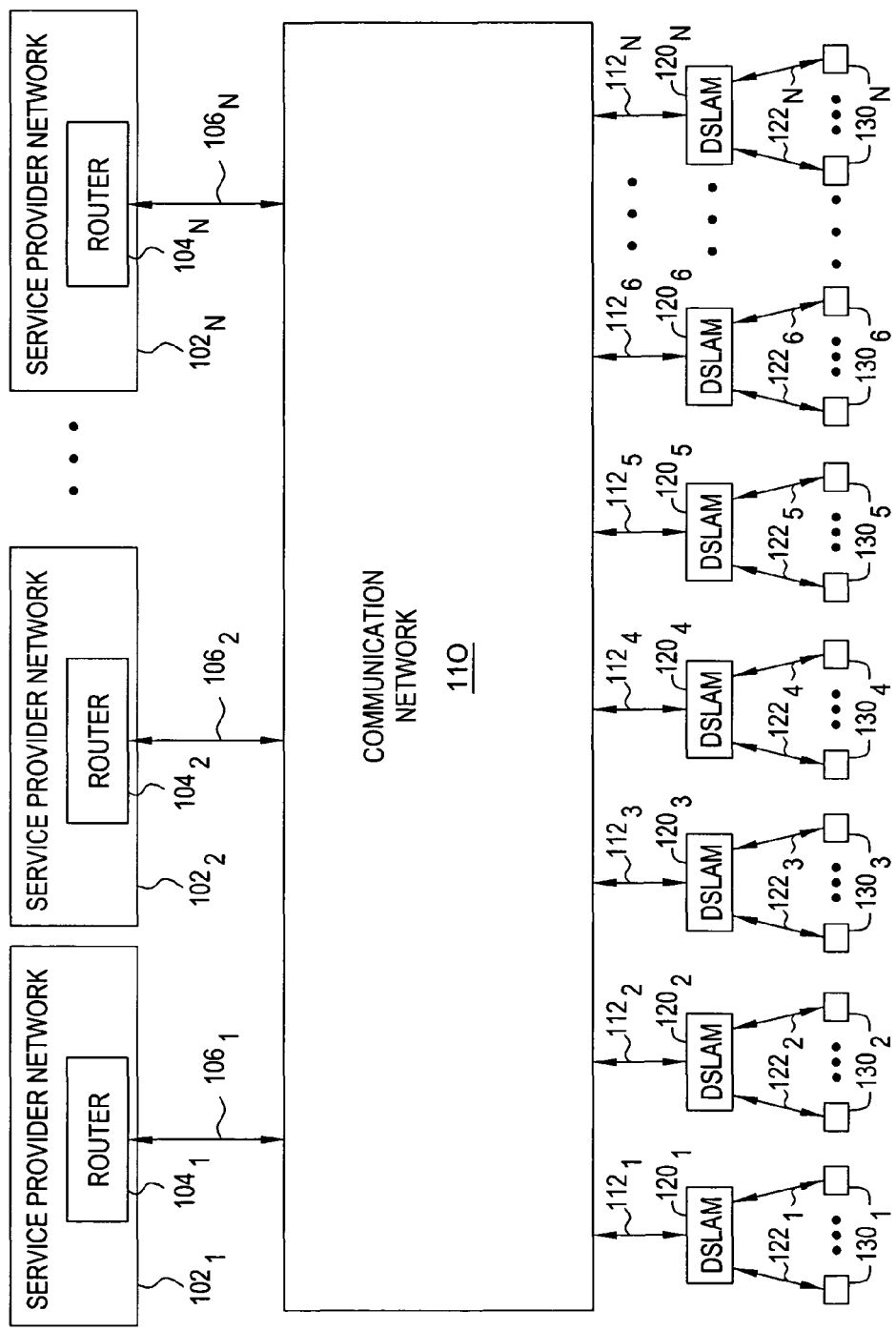
FIG. 1 depicts a high-level block diagram of a communications network architecture.

The present invention is discussed in the context of an Ethernet network interconnecting service providers and digital subscriber line access multiplexers (DSLAMs) serving respective pluralities of end user terminals; however, the present invention can be readily applied to other networks and network topologies. Similarly, the present invention is discussed in the context of an Ethernet hub-and-spoke network architecture; however, the present invention can be readily applied to other network architectures. The present invention may be implemented using various networks, network topologies, network architectures, switch types, multiplexer types, and the like, as well as various combinations thereof, and, therefore, is not limited by the network configurations depicted and described herein.

In general, the present invention enables Internet Protocol television (IPTV) service, including IPTV service traffic and associated control traffic, to be provided over a single network without the disadvantages of existing networks providing this combination of services. In particular, the present invention provides replication (in the direction of transmission from the hub switch to the spoke switches) of a first traffic type (e.g., IPTV service traffic) at a first network layer and provides merging (in the direction of transmission from the spoke switches to the hub switch) of a second traffic type (e.g., IPTV control traffic adapted for controlling the IPTV service traffic) at a second network layer. In one embodiment, the first network layer and second network layer are different. In one embodiment, the network layers are defined in accordance with the Open Systems Interconnection (OSI) Reference Model.

In accordance with the present invention, replication of the first traffic type (also denoted as type one traffic) is performed at a first network layer. In one embodiment, the first network layer comprises either the OSI physical layer (i.e., OSI layer one) or a combination of the OSI physical layer and a portion of OSI data link layer (i.e., OSI layers one and two, respectively). For example, type one traffic may be replicated at a first network layer using at least one of Synchronous Optical Network (SONET) network, a Synchronous Digital Hierarchy (SDH) network, an Optical Transport Network (OTN), a Plesiochronous Digital Hierarchy (PDH) network, and like layer one networks, network elements, and associated protocols.

In accordance with the present invention, merging of the second traffic type (also denoted as type two traffic) is performed at a second network layer. In one embodiment, the second network layer comprises the OSI data link layer (i.e., OSI layer two). In one such embodiment, the second network layer at which merging of the second traffic type is performed may include Ethernet and like networks, network elements, and associated protocols. In one such embodiment, Ethernet may be provided over any of a plurality of associated OSI physical layer networks, network elements, and associated protocols (e.g., Ethernet over OTN, Ethernet over PDH, and the like).

In one embodiment, the second network layer comprises the OSI network layer (i.e., OSI layer three). In one embodiment, the second network layer comprises a combination of OSI layers (e.g., a combination of the OSI data link and network layers). In one such embodiment, the second network layer comprises Multiprotocol Label Switching (MPLS). Since MPLS comprises a framework providing enhancements to the OSI data link layer network layer technologies, MPLS essentially straddles a plurality of OSI layers. As such, in an embodiment in which MPLS is used for merging type two traffic at a second network layer, the second network layer comprises a combination of OSI layers. In one embodiment, the second network layer comprises Internet Protocol (IP).

Although described herein as using OSI layer one technologies for providing replication of type one traffic and using OSI layer two/three/four technologies for providing merging of type two traffic, other combinations of different-layer technologies may be used in accordance with the present invention (i.e., ensuring that the first network layer and second network layer are different). Although primarily described herein as using OSI layer one technologies for providing replication of downstream, multicast IPTV traffic and using OSI layer two technologies for providing merging of upstream, unicast IPTV control traffic, other traffic types may be transported across the networks described herein, as well as utilizing various other combinations of networks, network elements, and protocols operating at different combinations of OSI Reference Model layers.

By providing broadcast replication of the type one traffic at a lower network layer (i.e., at a network layer lower than the network layer at which the type two traffic is merged), the present invention prevents replication of the type one traffic at the hub switch, thereby preventing identical data (e.g., identical Ethernet frames) from traversing the same network links from the hub switch to the spoke switches and, therefore, preventing bandwidth inefficiency. By providing unicast merging of the type two traffic at a higher network layer (i.e., at a network layer higher than the network layer at which the type one traffic is replicated), the present invention obviates the need for additional communication links for delivering the type two traffic from the end user terminals to the service provider routers.

In one embodiment, the present invention enables transport of a third traffic type (denoted as type three traffic). In one embodiment, transmission of type three traffic in the downstream direction shares the communication links used for transmission of the type one traffic transmitted in the downstream direction and transmission of type three traffic in the upstream direction shares the communication links used for transmission of the type two traffic transmitted in the upstream direction. In one such embodiment, transmission of type three traffic is performed using the first network layer for downstream transmission and using the second network layer for upstream transmission. In another embodiment, transport of type three traffic is performed independent of the transport of type one and type two traffic in accordance with the present invention. In one such embodiment type three traffic is transported using any transport medium, irrespective of type one traffic and type two traffic. In one embodiment, type three traffic comprises Internet service traffic (e.g., Internet access negotiation messaging, Internet data client requests, Internet data server responses, data transmissions between end user terminals, and the like).

FIG. 1 depicts a high-level block diagram of a communications network architecture. The communications network architecture 100 of FIG. 1 includes a plurality of service provider networks (SPNs) $102_1$-$102_N$ (collectively, SPNs 102) including an associated plurality of service provider routers (SPRs) $104_1$-$104_N$ (collectively, SPRs 104), a communication network (CN) 110, a plurality of digital subscriber line access multiplexers (DSLAMs) $120_1$-$120_N$ (collectively, DSLAMs 120), and respective pluralities of end user terminals (EUTs) $130_1$-$130_N$ (collectively, EUTs 130). As depicted in FIG. 1, SPRs $104_1$-$104_N$ communicate with CN 110 using a respective plurality of communication links (CLs) $106_1$-$106_N$ (collectively, CLs 106), DSLAMS $120_1$-$120_N$ communicate with CN 110 using a respective plurality of communication links (CLs) $112_1$-$112_N$ (collectively, CLs 112), EUTs $130_1$-$130_N$ communicate with DSLAMs $120_1$-$120_N$ using respective pluralities of communication links (CLs) $122_1$-$122_N$ (collectively, CLs 122).

As depicted in FIG. 1, SPNs 102 are associated with a respective plurality of service providers. In one embodiment, the service providers at least provide IPTV service and Internet service. Although primarily described as providing IPTV service and Internet service, service providers may provide various other IP-based services. As such, as depicted in FIG. 1, SPRs 104 include routers operable for transmitting television programming towards EUTs 130 and operable for receiving IPTV control traffic and Internet traffic from EUTs 130. The IPTV control traffic may include Internet Group Multicast Protocol (IGPM) messages. The Internet traffic may include Internet access requests, Internet data requests, data intended for other end user terminals, and the like. As such, SPRs 104 are operable for routing communications from EUTs to various servers for responding to user requests, to other service provider routers, and the like.

As depicted in FIG. 1, CN 110 comprises a communication network for facilitating communications between SPNs 102 (via SPRs 104) and EUTs 130 (via DSLAMs 120). Although not depicted, CN 110 comprises a plurality of network elements. In one such embodiment, CN 110 comprises a plurality of layer-two network elements (e.g., Open System Interconnection model layer-two network elements, such as Ethernet switches) and a plurality of layer-one network elements (e.g., Open System Interconnection model layer-one network elements, such as Synchronous Optical Network (SONET) network elements, Synchronous Digital Hierarchy (SDH) network elements, and the like).

In one such embodiment, the layer-two network elements are arranged in a hub-and-spoke network topology. In one such embodiment, the hub network element(s) is interconnected to the spoke network element(s), in the downstream transmission direction (i.e., transmission from SPNs 102 towards EUTs 130), using the plurality of layer-one network elements. In one such embodiment, the spoke network element(s) is directly connected to the hub network element(s), in the upstream transmission direction (i.e., transmission from EUTs 130 towards SPNs 102). Although primarily described herein with respect to layer-two network elements and layer one network elements, the present invention may be implemented using various other network element types, network element configurations, and the like.

With respect to downstream transmission (e.g., from SPRs 104 towards EUTs 130) of type one traffic (e.g., IPTV service traffic), the layer-two hub network element(s) is adapted for transmitting the type one traffic downstream using the layer-one network elements such that replication of the type one traffic is performed by the layer-one network elements in a manner that is transparent to the layer-two hub network element and the layer-two spoke network elements. With respect to downstream transmission of the type one traffic, the layer-two spoke network element(s) is adapted for receiving the replicated type one traffic and forwarding the replicated type one traffic towards the end users (i.e., towards EUTs 130).

With respect to upstream transmission (e.g., from EUTs 130 towards SPRs 104) of type two traffic (e.g., IPTV control traffic), the layer-two spoke network element(s) is adapted for transmitting the type two traffic using communication links between the layer-two spoke network elements and layer-two hub network elements. With respect to upstream transmission of the type two traffic, the layer-two hub network element(s) is adapted for merging the type two traffic according to the service provider for which the type two traffic is intended, thereby reducing the layer-two infrastructure required for transporting the type two traffic from the end users to the service providers.

As depicted in FIG. 1, DSLAMs 120 facilitate communication between CN 110 and EUTs 130. In one embodiment, DSLAMs 120 are adapted for receiving type one traffic (e.g., IPTV service traffic) from network 110 and forwarding the type one traffic towards the EUTs 130. In one embodiment, DSLAMs 120 are adapted for receiving type two traffic (e.g., IPTV control traffic) from EUTs 130 and forwarding the type two traffic towards CN 110. Although depicted and described herein with respect to using DSLAMs for facilitating communications between CN 110 and EUTs 130, those skilled in the art will appreciate that various other network elements, or combinations of network elements, may be used.

As depicted in FIG. 1, EUTs 130 comprise end user terminals adapted for receiving, processing, and transmitting various types of information. In one embodiment, EUTs 130 are adapted for receiving type one traffic (e.g., IPTV service traffic broadcast from a TV service provider). In one embodiment, EUTs 130 are adapted for transmitting type two traffic (e.g., IPTV control traffic) towards an Internet service provider router. For example, an end user may request a channel change by transmitting IPTV control traffic (e.g., IGMP messages) upstream towards one of the SPRs 104. In one embodiment, EUTs 130 include, or, optionally, are coupled to, at least one of a display device operable for displaying information to the end user, a control device for enabling the end user to control the information that is displayed and interact in response to the information that is displayed, and like devices typically associated with end user terminals.

Although depicted and described herein as comprising specific network configurations, those skilled in the art will appreciate that the present invention may be implemented using various other network configurations. Specifically, different network topologies, network elements, and the like may be utilized for implementing the present invention. Furthermore, for purposes of clarity by example, two service providers, as well as two associated virtual local area networks, are depicted and described herein with respect to FIG. 2-FIG. 5; however, those skilled in the art will appreciate that fewer or more service providers and associated virtual local area networks may be supported using the present invention.

Figure 2:
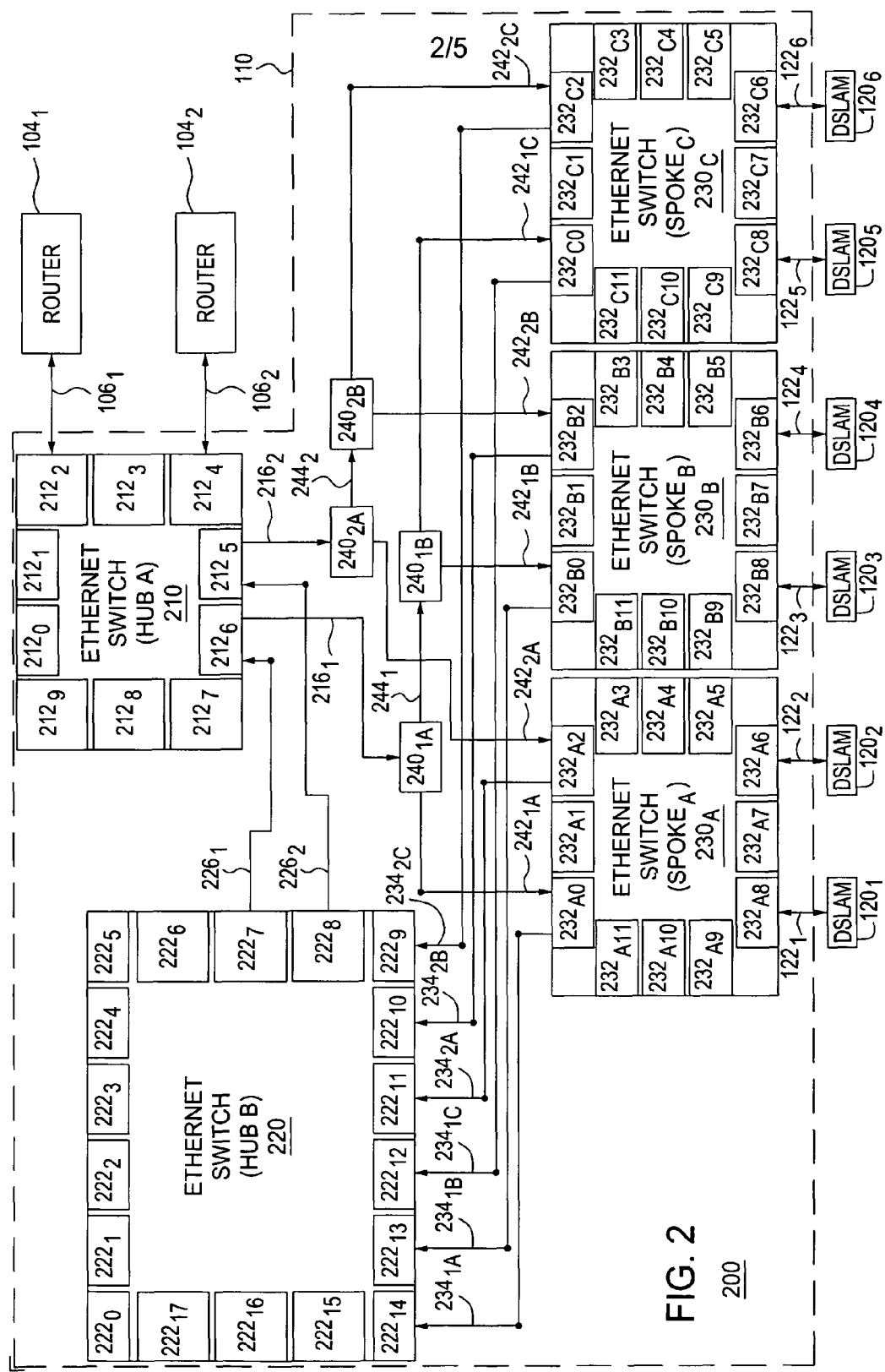
FIG. 2 depicts a high-level block diagram of one embodiment of the communication network of FIG. 1.

FIG. 2 depicts a high-level block diagram of one embodiment of CN 110 of FIG. 1. Specifically, CN 110 of FIG. 2 comprises a first Ethernet switch 210, a second Ethernet switch 220, a plurality of third Ethernet switches $230_A$-$230_C$ (collectively, third Ethernet switches 230), and a plurality of SDH replication multiplexers $240_{1A}$-$240_{1B}$ and $240_{2A}$-$240_{2B}$. The first Ethernet switch 210, second Ethernet switch 220, and third Ethernet switches 230 comprise layer-two network elements. The SDH replication multiplexers 240 comprise layer-one network elements. With respect to configuration and functionality, network elements of CN 110 may be denoted as different node types.

As depicted in FIG. 2, first Ethernet switch 210, second Ethernet switch 220, and third Ethernet switches 230 are interconnected in a hub-and-spoke network topology. As such, first Ethernet switch 210 and second Ethernet switch 220 comprise hub switches (e.g., first Ethernet switch 210 and second Ethernet switch 220 are denoted as hub A and hub B, respectively) and third Ethernet switches 230 comprise spoke switches (e.g., third Ethernet switches $230_A$-$230_C$ are denoted as spoke A, spoke B, and spoke C, respectively). As depicted in FIG. 2, SDH replication multiplexers 240 are interconnected in a manner for replicating the type one traffic transmitted from first Ethernet switch 210 towards third Ethernet switches 230.

As depicted in FIG. 2, first Ethernet switch 210 comprises a plurality of ports $212_0$-$212_9$ (collectively, ports 212). With respect to downstream transmissions, first Ethernet switch 210 is configured for forwarding the type one traffic towards the third Ethernet switches 230 without replication of the type one traffic. With respect to upstream transmissions, first Ethernet switch 210 is configured for receiving the type two traffic (e.g., IPTV control traffic merged according to intended destination router) and forwarding the type two traffic upstream towards the intended destination router (illustratively, towards SPRs 104). In one embodiment, first Ethernet switch 210 is configured for transmitting and receiving type one traffic and type two traffic using VLAN Port Member Set configuration. As depicted in FIG. 2, ports $212_0$, $212_1$, $212_3$, $212_7$, $212_8$, and $212_9$ are not configured.

As depicted in FIG. 2, port $212_2$ is a bidirectional port coupled to SPR $104_1$ using CL $106_1$, port $212_4$ is a bidirectional port coupled to SPR $104_2$ using CL $106_2$, port $212_5$ is a bidirectional port coupled to SDH replication multiplexer $240_{2A}$ (in the downstream direction) using a communication link (CL) $216_2$ and coupled to a unidirectional egress port (illustratively, unidirectional egress port $222_8$) of second Ethernet switch 220 (in the upstream direction) using a unidirectional communication link (UCL) $226_2$, and port $212_6$ is a bidirectional port coupled to SDH replication multiplexer $240_{1A}$ (in the downstream direction) using a communication link (CL) $216_1$ and coupled to a unidirectional egress port (illustratively, unidirectional egress port $222_7$) of second Ethernet switch 220 (in the upstream direction) using a unidirectional communication link (UCL) $226_1$.

As depicted in FIG. 2, third Ethernet switches 230 each comprise a plurality of bidirectional ports. With respect to downstream transmission, third Ethernet switches 230 are configured for forwarding the type one traffic (e.g., IPTV service traffic) downstream towards DSLAMs 120. With respect to upstream transmissions, third Ethernet switches 230 are configured for forwarding the type two traffic (e.g., IPTV control traffic) upstream towards second Ethernet switch 220. In one embodiment, third Ethernet switches 230 are configured for transmitting and receiving type one traffic and type two traffic using VLAN Port Member Set configuration.

As depicted in FIG. 2, third Ethernet switch $230_A$ comprises a plurality of ports $232_{A0}$-$232_{A11}$ (collectively, ports $232_A$). The third Ethernet switch $230_B$ comprises a plurality of ports $232_{B0}$-$232_{B11}$ (collectively, ports $232_B$). The third Ethernet switch $230_C$ comprises a plurality of ports $232_{C0}$-$232_{C11}$ (collectively, ports $232_C$). The ports $232_A$, $232_B$, and $232_C$ of the third Ethernet switches $230_A$, $230_B$, and $230_C$ are collectively denoted as ports 232. As depicted in FIG. 2, ports $232_A$, $232_{A3}$-$232_{A5}$, $232_{A7}$, and $232_{A9}$-$232_{A11}$ are not configured. As depicted in FIG. 2, ports $232_{B1}$, $232_{B3}$, $232_{B4}$, $232_{B5}$, $232_{B7}$, $232_{B9}$, $232_{B10}$, and $232_{B11}$ are not configured. As depicted in FIG. 2, ports $232_{C1}$, $232_{C3}$, $232_{C4}$, $232_{C5}$, $232_{C7}$, $232_{C9}$, $232_{C10}$, and $232_{C11}$ are not configured.

As depicted in FIG. 2, port $232_{A0}$ is a bidirectional port coupled to SDH replication multiplexer $240_{1A}$ (in the downstream direction) using a unidirectional communication link (UCL) $242_{1A}$ and coupled to a unidirectional ingress port (illustratively, unidirectional ingress port $222_{14}$) of second Ethernet switch 220 (in the upstream direction) using a unidirectional communication link (UCL) $234_{1A}$. As depicted in FIG. 2, port $232_{A2}$ is a bidirectional port coupled to SDH replication multiplexer $240_{2A}$ (in the downstream direction) using a unidirectional communication link (UCL) $242_{2A}$ and coupled to a unidirectional ingress port (illustratively, unidirectional ingress port $222_{11}$) of second Ethernet switch 220 (in the upstream direction) using a unidirectional communication link (UCL) $234_{2A}$. As depicted in FIG. 2, ports $232_{A6}$ and $232_{A8}$ are bidirectional ports coupled to DSLAMs $120_2$ and $120_1$ using CLs $122_2$ and $122_1$, respectively.

As depicted in FIG. 2, port $232_{B0}$ is a bidirectional port coupled to SDH replication multiplexer $240_{1B}$ (in the downstream direction) using a unidirectional communication link (UCL) $242_{1B}$ and coupled to a unidirectional ingress port (illustratively, unidirectional ingress port $222_{13}$) of second Ethernet switch 220 (in the upstream direction) using a unidirectional communication link (UCL) $234_{1B}$. As depicted in FIG. 2, port $232_{B2}$ is a bidirectional port coupled to SDH replication multiplexer $240_{2B}$ (in the downstream direction) using a unidirectional communication link (UCL) $242_{2B}$ and coupled to a unidirectional ingress port (illustratively, unidirectional ingress port $222_{10}$) of second Ethernet switch 220 (in the upstream direction) using a unidirectional communication link (UCL) $234_{2B}$. As depicted in FIG. 2, ports $232_{B6}$ and $232_{B8}$ are bidirectional ports coupled to DSLAMs $120_4$ and $120_3$ using CLs $122_4$ and CLs $122_3$, respectively.

As depicted in FIG. 2, port $232_{C0}$ is a bidirectional port coupled to SDH replication multiplexer $240_{1B}$ (in the downstream direction) using a unidirectional communication link (UCL) $242_{1C}$ and coupled to a unidirectional ingress port (illustratively, unidirectional ingress port $222_{12}$) of second Ethernet switch 220 (in the upstream direction) using a unidirectional communication link (UCL) $234_{C1}$. As depicted in FIG. 2, port $232_{C2}$ is a bidirectional port coupled to SDH replication multiplexer $240_{2B}$ (in the downstream direction) using a unidirectional communication link (UCL) $242_{2C}$ and coupled to a unidirectional ingress port (illustratively, unidirectional ingress port $222_9$) of second Ethernet switch 220 (in the upstream direction) using a unidirectional communication link (UCL) $234_{2C}$. As depicted in FIG. 2, ports $232_{C6}$ and $232_{C8}$ are bidirectional ports coupled to DSLAMs $120_6$ and $120_5$ using CLs $122_6$ and CLs $122_5$, respectively.

As depicted in FIG. 2, second Ethernet switch 220 comprises a plurality of ports $222_0$-$222_{17}$ (collectively, ports 222). The second Ethernet switch 220 is configured for receiving unidirectional upstream traffic and merging the unidirectional upstream traffic according to the service provider router for which the unidirectional upstream traffic is destined. In one embodiment, the unidirectional upstream traffic (e.g., IPTV control traffic) is merged at the data link layer (i.e., using a layer-two communication protocol). The second Ethernet switch 220 is configured for forwarding the merged traffic towards the service provider router associated with the merged traffic. As depicted in FIG. 2, ports $222_0$-$222_6$ and $222_{15}$-$222_{17}$ are not configured. In one embodiment, second Ethernet switch 220 is configured for transmitting and receiving type one traffic and type two traffic using VLAN Port Member Set configuration.

As depicted in FIG. 2, ports $222_{14}$, $222_{13}$, $222_{12}$ $222_{11}$, $222_{10}$, and $222_9$ comprise unidirectional ingress ports. The unidirectional ingress ports $222_{14}$, $222_{13}$, and $222_{12}$ are coupled to ports $232_{A0}$, $232_{B0}$, and $232_{C0}$ of third Ethernet switches $230_A$, $230_B$, and $230_C$ using UCLs $234_{1A}$, $234_{1B}$, and $234_{1C}$ (collectively, UCLs $234_1$), respectively. The unidirectional ingress ports $222_{14}$, $222_{13}$, and $222_{12}$ receive upstream traffic from third Ethernet switches $230_A$, $230_B$, and $230_C$, respectively. The unidirectional ingress ports $222_{11}$, $222_{10}$, and $222_9$ are coupled to ports $232_{A2}$, $232_{B2}$, and $232_{C2}$ of third Ethernet switches $230_A$, $230_B$, and $230_C$ using UCLs $234_{2A}$, $234_{2B}$, and $234_{2C}$ (collectively, UCLs $234_2$), respectively.

As depicted in FIG. 2, port $222_7$ is a unidirectional egress port coupled to port $212_6$ of first Ethernet switch 210 using UCL $226_1$, for forwarding merged type one traffic destined for SPR $104_1$ towards first Ethernet switch 210. The merged type one traffic destined for SPR $104_1$ includes upstream type one traffic received on unidirectional ingress ports $222_{14}$, $222_{13}$, and $222_{12}$ of second Ethernet switch 220. As depicted in FIG. 2, port $222_8$ is a unidirectional port coupled to port $212_6$ of first Ethernet switch 210 using UCL $226_2$, for forwarding merged type one traffic destined for SPR $104_2$ towards first Ethernet switch 210. The merged type one traffic destined for SPR $104_2$ includes upstream traffic received on unidirectional ingress ports $222_{11}$, $222_{10}$, and $222_9$ of second Ethernet switch 220.

In general, CN 110 is configured for transporting type one traffic downstream from service providers to end users and transporting type two traffic upstream from end users to service providers. With respect to downstream transmission of type one traffic from service providers to end users, first Ethernet switch 210, SDH replication multiplexers 240, and third Ethernet switches 230 are configured for delivering the type one traffic from SPRs 104 to EUTs 130 using associated DSLAMs 120. With respect to upstream transmission of type two traffic from end users to service providers, first Ethernet switch 210, second Ethernet switch 220, and third Ethernet switches 230 are configured for delivering the type two traffic from EUTs 130 to SPRs 104 using associated DSLAMs 120.

As depicted in FIG. 2, IPTV service traffic is transmitted from SPRs $104_1$ and $104_2$ to ports $212_2$ and $212_4$ of first Ethernet switch 210, respectively. The port $212_2$ is configured for receiving the IPTV service traffic originating from SPR $104_1$. The first Ethernet switch 210 is configured for switching the IPTV service traffic from port $212_2$ to port $212_6$. The port $212_4$ is configured for receiving the IPTV service traffic originating from SPR $104_2$. The first Ethernet switch 210 is configured for switching the IPTV service traffic from port $212_4$ to port $212_5$. In accordance with the present invention, first Ethernet switch 210 is configured for preventing replication of the IPTV service traffic; rather, IPTV service traffic is replicated further downstream using layer-one replication network elements (illustratively, SDH replication multiplexers 240).

The port $212_6$ is configured for transmitting the IPTV service traffic to SDH replication multiplexer $240_{1A}$. The SDH replication multiplexer $240_{1A}$ replicates the IPTV service traffic (i.e., performs layer-one replication). The SDH replication multiplexer $240_{1A}$ transmits one version of the replicated IPTV service traffic to port $232_{A0}$ using UCL $242_{1A}$. The SDH replication multiplexer $240_{1A}$ transmits another version of the replicated IPTV service traffic to SDH replication multiplexer $240_{1B}$ using a communication link (CL) $244_1$. The SDH replication multiplexer $240_{1B}$ replicates the IPTV service traffic (i.e., performs layer-one replication). The SDH replication multiplexer $240_{1B}$ transmits one version of the replicated IPTV service traffic to port $232_{B0}$ using UCL $242_{1B}$. The SDH replication multiplexer $240_{1B}$ transmits another version of the replicated IPTV service traffic to port $232_{C0}$ using UCL $242_{1C}$.

The port $212_5$ is configured for transmitting the IPTV service traffic to SDH replication multiplexer $240_{2A}$. The SDH replication multiplexer $240_{2A}$ replicates the IPTV service traffic (i.e., performs layer-one replication). The SDH replication multiplexer $240_{2A}$ transmits one version of the replicated IPTV service traffic to port $232_{A2}$ using UCL $242_{2A}$. The SDH replication multiplexer $240_{2A}$ transmits another version of the replicated IPTV service traffic to SDH replication multiplexer $240_{2B}$ using a communication link (CL) $244_2$. The SDH replication multiplexer $240_{2B}$ replicates the IPTV service traffic (i.e., performs layer-one replication). The SDH replication multiplexer $240_{2B}$ transmits one version of the replicated IPTV service traffic to port $232_{B2}$ using UCL $242_{2B}$. The SDH replication multiplexer $240_{2B}$ transmits another version of the replicated IPTV service traffic to port $232_{C2}$ using UCL $242_{2C}$.

As depicted in FIG. 2, ports $232_{A0}$, $232_{B0}$, and $232_{C0}$ and ports $232_{A2}$, $232_{B2}$, and $232_{C2}$ are configured for receiving IP service traffic from SDH replication multiplexers $240_{2A}$ and $240_{2B}$ and SDH replication multiplexers $240_{1A}$ and $240_{1B}$, respectively. The third Ethernet switch $230_A$ is configured for switching the IPTV service data between ports $232_{A0}$ and $232_{A2}$ and ports $232_{A6}$ and $232_{A8}$ according to the destination end user terminal. The third Ethernet switch $230_B$ is configured for switching the IPTV service data between ports $232_{B0}$ and $232_{B2}$ and ports $232_{16}$ and $232_{B8}$ according to the destination end user terminal. The third Ethernet switch $230_C$ is configured for switching the IPTV service data between ports $232_{C0}$ and $232_{C2}$ and ports $232_{C6}$ and $232_{C8}$ according to the destination end user terminal.

As depicted in FIG. 2, IPTV control traffic (e.g., for communicating an IPTV channel change operation) is transmitted from end user terminals (not depicted with respect to FIG. 2) to associated DSLAMs (illustratively, DSLAMs 120). The IPTV control traffic is transmitted from DSLAMs $120_1$ and $120_2$ to ports $232_{A8}$ and $232_{A6}$ of third Ethernet switch $230_A$, respectively, from DSLAMs $120_3$ and $120_4$ to ports $232_{B8}$ and $232_{B6}$ of third Ethernet switch $230_B$, respectively, and from DSLAMs $120_5$ and $120_6$ to ports $232_{C8}$ and $232_{C6}$ of third Ethernet switch $230_C$, respectively. The third Ethernet switches $230_A$, $230_B$, and $230_C$ are configured for switching the IPTV control traffic between ports $232_{A6}$ and $232_{A8}$ and ports $232_{A0}$ and $232_{A2}$, between ports $232_{B6}$ and $232_{B8}$ and ports $232_{B0}$ and $232_{B2}$, and between ports $232_{C6}$ and $232_{C8}$ and ports $232_{C0}$ and $232_{C2}$, respectively.

As depicted in FIG. 2, ports $232_{A0}$ and $232_{A2}$, ports $232_{B0}$ and $232_{B2}$, and ports $232_{C0}$ and $232_{C2}$ are configured for receiving the IPTV control traffic. The ports $232_{A0}$ and $232_{A2}$, ports $232_{B0}$ and $232_{B2}$, and ports $232_{C0}$ and $232_{C2}$ are configured for transmitting the IPTV control traffic to unidirectional ingress ports $222_{14}$ and $222_{11}$, ports $222_{13}$ and $222_{10}$, and ports $222_{12}$ and $222_9$ using UCLs $234_{1A}$ and $232_{2A}$, UCLs $234_{1B}$ and $234_{2B}$, UCLs $234_{1C}$ and $234_{2C}$, respectively. In accordance with the present invention, third Ethernet switches 230 are configured in a manner for preventing merging of IPTV control traffic; rather, IPTV control traffic is merged further upstream using a layer-two network element (illustratively, second Ethernet switch 220).

As depicted in FIG. 2, ports $222_{14}$ and $222_{11}$, ports $222_{13}$ and $222_{10}$, and ports $222_{12}$ and $222_9$ are configured for receiving the IPTV control traffic from ports $232_{A0}$ and $232_{A2}$, ports $232_{B0}$ and $232_{B2}$, and ports $232_{C0}$ and $232_{C2}$, respectively. The second Ethernet switch 220 is adapted for merging received IPTV control traffic according to the destination service provider router. As depicted in FIG. 2, IPTV control traffic from ports $222_{14}$, $222_{13}$, and $222_{12}$ is merged and switched to port $222_7$ and IPTV control traffic from ports $222_{11}$, $222_{10}$, and $222_9$ is merged and switched to port $222_8$. The ports $222_7$ and $222_8$ are configured for transmitting the merged IPTV control traffic to ports $212_6$ and $212_5$ on first Ethernet switch 210 using UCLs $226_1$ and $226_2$, respectively.

As depicted in FIG. 2, ports $212_6$ and $212_5$ on first Ethernet switch 210 are configured for receiving the IPTV control traffic from ports $222_7$ and $222_8$, respectively. The first Ethernet switch 210 is adapted for switching merged IPTV control traffic according to the destination service provider router. As depicted in FIG. 2, IPTV control traffic received on port $212_6$ is switched to port $212_2$ and IPTV control traffic received on port $212_5$ is switched to port $212_4$. The ports $212_2$ and $212_4$ are configured for transmitting the merged IPTV control traffic to SPRs $104_1$ and $104_2$ using CLs $106_1$ and $106_2$, respectively. The SPRs $104_1$ and $104_2$ receive and process the received IPTV control traffic.

In one embodiment, type three traffic (e.g., Internet service traffic) is transmitted downstream from SPRs 104 to first Ethernet switch 210. The first Ethernet switch 210 transmits the Internet service traffic to SDH replication multiplexers $240_{1A}$ and $240_{2A}$ using UCLs $216_1$ and $216_2$. The SDH replication multiplexers $240_{1A}$ and $240_{2A}$ transmit the Internet service traffic to third Ethernet switches 230 via SDH replication multiplexers $240_{1B}$ and $240_{2B}$ using UCLs $242_{1A}$-$242_{1C}$ and $242_{2A}$-$242_{2C}$. The third Ethernet switches 230 transmit the Internet service traffic to EUTs 130 using DSLAMs 120. Similarly, in this embodiment, Internet service traffic is transmitted upstream from EUTs 130 to third Ethernet switches 230 using DSLAMs 120. The third Ethernet switches 230 transmit the Internet service traffic upstream to second Ethernet switch 220 using UCLs 234. The second Ethernet switch 220 transmits the Internet service traffic to first Ethernet switch 210 using UCLs 226. The first Ethernet switch 210 transmits the Internet service traffic to SPRs 104 using BCLs 106.

As depicted and described herein with respect to FIG. 2, in one embodiment, first Ethernet switch 210, second Ethernet switch 220 and third Ethernet switches 230 are configured normally (i.e., using a typical IEEE 802.1Q switch configuration, however, downstream and upstream traffic is routed differently through the network. In one such embodiment, downstream IPTV traffic from the service provider networks is transported to a plurality of DSLAMs using multicast connections and upstream IPTV control from the end users is routed to second Ethernet switch 220 which aggregates the upstream unicast connections for transport to the service provider networks via first Ethernet switch 210.

As described herein, Institute of Electronics and Electrical Engineers (IEEE) 802.1Q compliant bridges are configured by defining a plurality of port parameters for each of the ports associated with the bridge (e.g., PVID, member set, untagged set, ingress filtering, and the like). The PVID parameter determines the VLAN identifier (VID) for frames that arrive at a port untagged (i.e., without a VLAN ID). The member set parameter determines the VID(s) of which the port is a member (i.e., for which VID(s) the port may transmit and receive frames. The untagged set parameter determines the VID(s) for which the port transmits the frames untagged. The ingress filtering parameter determines the action taken on frames belonging to a particular VLAN when the port is not a member of that particular VLAN. If ingress filtering is turned on, the frame is dropped.

Table 1 depicts the port configurations for first Ethernet switch 210 and second Ethernet switch 220. Although FIG. 2 (and associated Table 1), for purposes of clarity, depicts different connections (using different ports) per service provider, it should be noted that service provider may share connections if the Ethernet frames associated with the shared connections are VLAN tagged where a VLAN identifier identifies the service provider. Furthermore, it should be noted that although specific letters and symbols are used for identifying particular VLAN configuration settings, various other values and value formats may be used for configuring layer-two network elements in accordance with the present invention.

TABLE 1

| Port | Parameter | Configuration | Notes |
|---|---|---|---|
| $212_2$ | PVID | x | Associated With SPR $104_1$ |
| | Member Set | {x} | |
| | Untagged Set | {x} ({ }) | Empty if frames are to be transmitted tagged towards SPR $104_1$ |
| | Ingress Filtering | - (yes) | Ingress filtering required is SPR $104_1$ transmits tagged frames |
| $212_4$ | PVID | y | Associated With SPR $104_2$ |
| | Member Set | {y} | |
| | Untagged Set | {y} ({ }) | Empty { } if frames are to be transmitted tagged towards SPR $104_2$ |
| | Ingress Filtering | - (yes) | Ingress filtering required is SPR $104_2$ transmits tagged frames |
| $212_5$ | PVID | - (y) | PVID required if second Ethernet switch 220 sends untagged frames |
| | Member Set | {y} | |
| | Untagged Set | { } ({y}) | y member of untagged set if frames are to be sent towards third Ethernet switches 230 (spoke switches) untagged |
| | Ingress Filtering | - (yes) | Ingress filtering not required if second Ethernet switch 220 is configured correctly |
| $212_6$ | PVID | - (x) | PVID required if second Ethernet switch 220 sends untagged frames |
| | Member Set | {x} | |
| | Untagged Set | { } ({x}) | x member of untagged set if frames are to be sent towards third Ethernet switches 230 (spoke switches) untagged |
| | Ingress Filtering | - (yes) | Ingress filtering not required if second Ethernet switch 220 is configured correctly |
| $222_7$ | PVID | - (x) | Not Required (port only transmits frames) |
| | Member Set | {x} | |
| | Untagged Set | { } ({x}) | x member of untagged set if frames are to be sent towards first Ethernet switch 210 untagged |
| | Ingress Filtering | - (yes) | Ingress filtering not required since port only transmits frames |
| $222_8$ | PVID | - (y) | Not Required (port only transmits frames) |
| | Member Set | {y} | |
| | Untagged Set | { } ({y}) | y member of untagged set if frames are to be sent towards first Ethernet switch 210 untagged |
| | Ingress Filtering | - (yes) | Ingress filtering not required since port only transmits frames |
| $222_9$ | PVID | - (y) | Required if spoke sends untagged frames |
| $222_{10}$ | Member Set | {y} | |
| $222_{11}$ | Untagged Set | { } | Empty, since port only receives frames |
| | Ingress Filtering | - (yes) | Ingress filtering not required if third Ethernet switches 230 (spoke switches) configured correctly |

TABLE 1-continued

| Port | Parameter | Configuration | Notes |
|---|---|---|---|
| $222_{12}$ | PVID | - (x) | Required if spoke sends untagged frames |
| $222_{13}$ | Member Set | {x} | |
| $222_{14}$ | Untagged Set | { } | Empty, since port only receives frames |
| | Ingress Filtering | - (yes) | Ingress filtering not required if third Ethernet switches 230 (spoke switches) configured correctly |

As depicted in Table 1, PVID=x corresponds to frames associated with the first service provider (i.e., SPR $104_1$) and PVID=y corresponds to frames associated with the second service provider (i.e., SPR $104_2$). As depicted in Table 1, the Untagged Set parameter indicates that frames may be sent tagged (if a letter is placed between brackets) or untagged (if a letter is not placed between brackets) over the associated communication link. For the Untagged Set parameter if multiple letters are placed between the brackets different SPRs may share the same communication link. As depicted in Table 1, the Untagged Set for ports $212_2$ and $212_4$ may be empty sets if the associated SPR expects the traffic VLAN tagged with VLAN identifier x or y, respectively. As depicted in Table 1, an Ingress Filtering parameter listed as "-(yes)" indicates that although it does not matter whether the Ingress Filtering parameter is set to "yes" or set to "no", the recommended setting is "yes".

Figure 3:
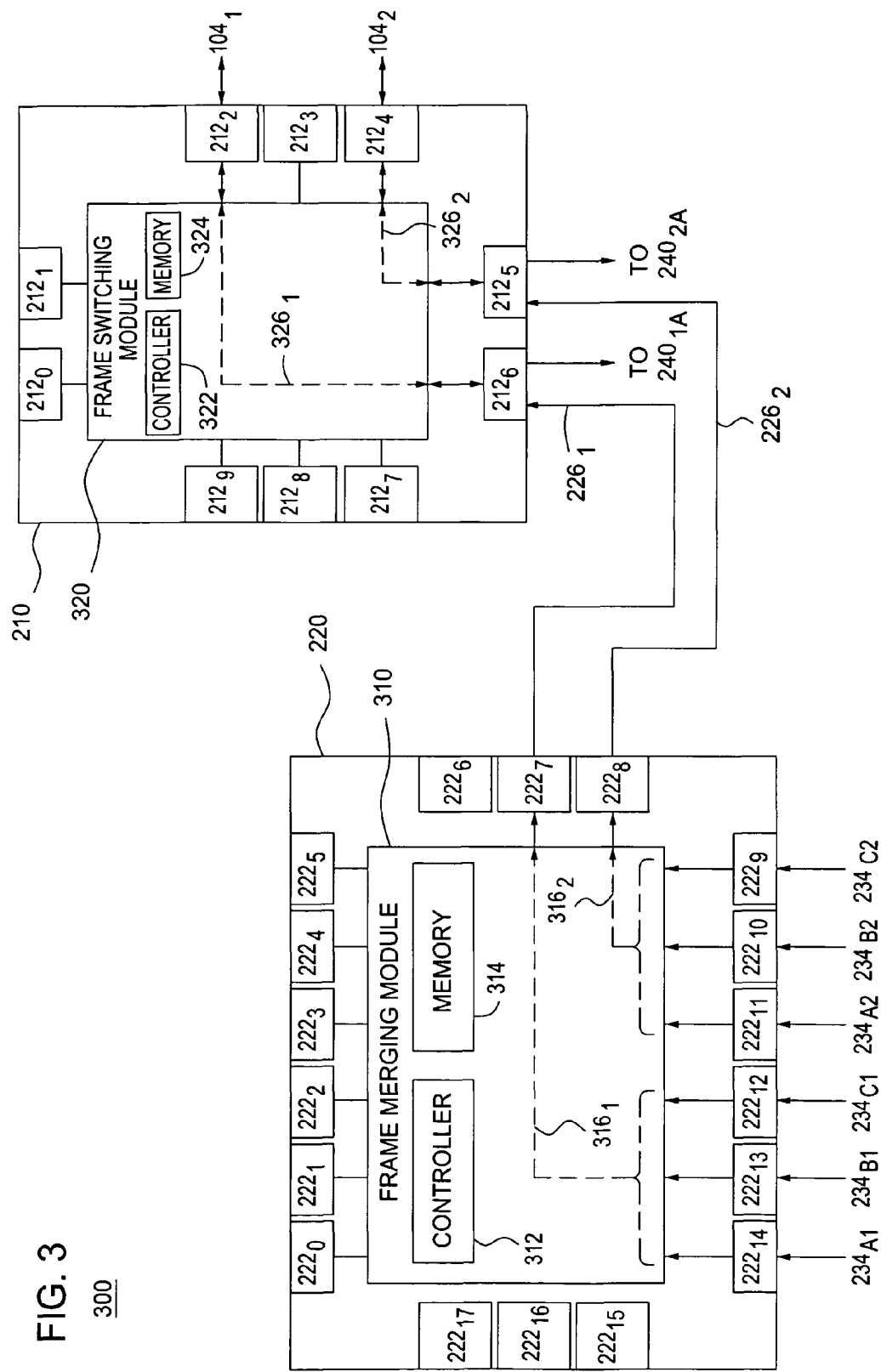
FIG. 3 depicts a high-level block diagram of one embodiment of the first hub switch and second hub switch of the communication network of FIG. 2.

FIG. 3 depicts a high-level block diagram of one embodiment of the first hub switch (i.e, first Ethernet switch 210) and second hub switch (i.e, second Ethernet switch 220) of the communication network of FIG. 2. The first Ethernet switch 210 comprises a frame switching module 320 coupled to each of ports 212 depicted and described with respect to FIG. 2. The second Ethernet switch 220 comprises a frame merging module 310 coupled to each of the ports 222 depicted and described with respect to FIG. 2. As depicted in FIG. 3, directionality of ports $212_0$, $212_1$, $212_3$, and $212_7$-$212_9$ of first Ethernet switch 210 and ports $222_0$-$222_6$ and $222_{15}$-$222_{17}$ of second Ethernet switch 220 is not indicated since each port may be configured for supporting unidirectional ingress communications, unidirectional egress communications, or bidirectional communications.

As depicted in FIG. 3, frame merging module 310 includes a controller 312 and a memory 314. In one embodiment, controller 312 is operable for controlling frame merging module 310. In one embodiment, controller 312 is operable for configuring and controlling ports 222. In one embodiment, at least one other controller (not depicted) associated with second Ethernet switch 220 may provide configuration and control of at least a portion of the functions of ports 222. In one embodiment, controller 312 communicates with memory 314 for providing at least a portion of the traffic merge functions of the present invention.

The frame merging module 310 merges upstream traffic received on ports 222. In one embodiment, frame merging module 310 merges upstream traffic received on ports 222 according to the intended service provider router. For example, as depicted in FIG. 3, frame merging module 310 merges IPTV control traffic received on ports $222_{14}$, $222_{13}$, and $222_{12}$ to form a first merged traffic stream $316_1$ which is routed to unidirectional egress port $222_7$ and merges IPTV control traffic received on ports $222_{11}$, $222_{10}$, and $222_9$ to form a second merged traffic stream $316_2$ which is routed to unidirectional egress port $222_8$.

As depicted in FIG. 3, frame switching module 320 includes a controller 322 and a memory 324. In one embodiment, controller 322 is operable for controlling frame switching module 320. In one embodiment, controller 322 is operable for configuring and controlling ports 212. In one embodiment, at least one other controller (not depicted) associated with first Ethernet switch 210 may provide configuration and control of at least a portion of the functions of ports 212. In one embodiment, controller 322 communicates with memory 324 for providing at least a portion of the traffic switching functions of the present invention.

The frame switching module 320 switches upstream and downstream traffic between ports 212. In one embodiment, frame switching module 320 switches upstream traffic received on ports $212_5$ and $212_6$ and switches downstream traffic received on ports $212_2$ and $212_4$ according to the intended service provider router. For example, as depicted in FIG. 3, frame switching module 320 switches upstream IPTV control traffic received on port $212_5$ and downstream IPTV service traffic received on port $212_2$ using a first switched traffic stream 326, and switches upstream IPTV control traffic received on port $212_6$ and downstream IPTV service traffic received on port $212_4$ using a second switched traffic stream $326_2$.

Although depicted and described with respect to FIG. 3 as comprising different modules, in one embodiment, frame merging module 310 and frame switching module 320 both comprise IEEE802.1-compliant bridges. In this embodiment, the IEEE802.1-compliant bridges are configured differently for performing the functions required to be supported by that bridge. For example, frame merging module 310 comprises a IEEE802.1-compliant bridge which is configured to provide the frame merging functions of the present invention. Similarly, for example, frame switching module 320 comprises a IEEE802.1-compliant bridge which is configured to provide the frame switching functions of the present invention.

Figure 4:
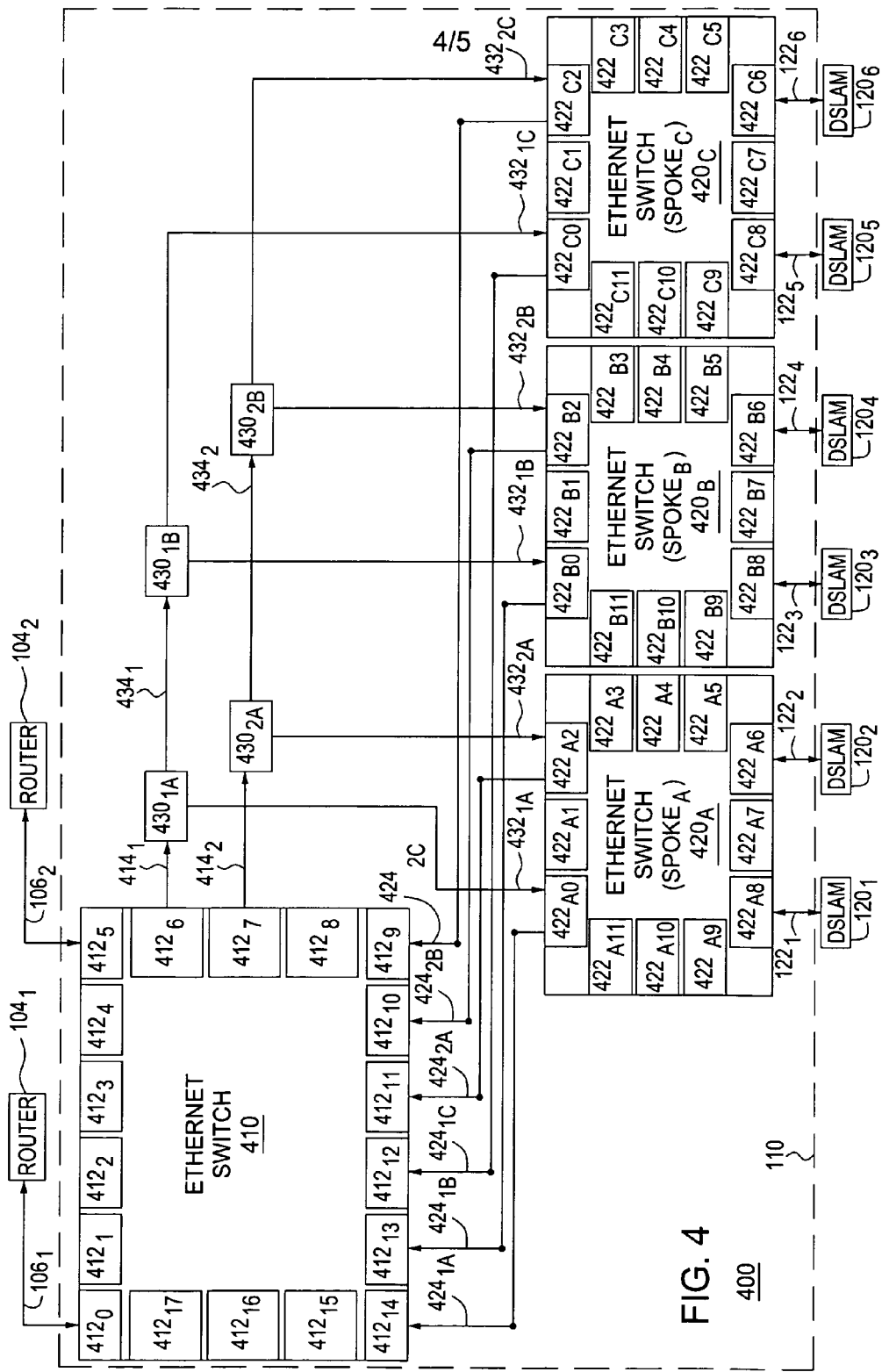
FIG. 4 depicts a high-level block diagram of one embodiment of the communication network of FIG. 1.

FIG. 4 depicts a high-level block diagram of one embodiment of the communication network of FIG. 1. Specifically, CN 110 of FIG. 4 comprises a first Ethernet switch 410, a plurality of second Ethernet switches $420_A$-$420_C$(collectively, second Ethernet switches 420), and a plurality of SDH replication multiplexers $430_{1A}$-$430_{1B}$ and $430_{2A}$-$430_{2B}$. The first Ethernet switch 410 and second Ethernet switches 420 comprise layer-two (i.e., Open System Interconnections data link layer) network elements. The SDH replication multiplexers 430 comprise layer-one (i.e., Open System Interconnections physical layer) network elements. With respect to configuration and functionality, the network elements of CN 110 may be denoted as different node types.

As depicted in FIG. 4, first Ethernet switch 410 and second Ethernet switches 420 are interconnected in a hub-and-spoke network topology. As such, first Ethernet switch 410 comprises a hub switch (e.g., first Ethernet switch 410 is denoted as hub A) and second Ethernet switches 420 comprise spoke switches (e.g., second Ethernet switches $420_A$, $420_B$, and $420_C$ are denoted as spoke A, spoke B, and spoke C, respectively). As depicted in FIG. 4, SDH replication multiplexers 430 are interconnected in a manner for replicating type one traffic transmitted from first Ethernet switch 410 towards second Ethernet switches 420.

As depicted in FIG. 4, first Ethernet switch 410 comprises a plurality of ports $412_0$-$412_{17}$ (collectively, ports 412). With respect to downstream transmission, first Ethernet switch 410 is configured for receiving type one traffic (e.g., IPTV service traffic) from service provider routers and forwarding the type one traffic towards the second Ethernet switches 420 without replication of the type one traffic. With respect to upstream transmission, first Ethernet switch 410 is configured for receiving type two traffic (e.g., IPTV control traffic) and merging the type two traffic according to the intended service provider router. The first Ethernet switch 410 is configured for forwarding the merged traffic towards the associated service provider router. As depicted in FIG. 4, ports $412_1$-$412_4$, $412_8$, and $412_{15}$-$412_{17}$ are not configured. In one embodiment, first Ethernet switch 410 is configured for transmitting and receiving type one traffic and type two traffic using VLAN Port Member Set configuration.

As depicted in FIG. 4, port $412_0$ is a bidirectional port coupled to SPR $104_1$ using CL $106_1$, and port $412_5$ is a bidirectional port coupled to SPR $104_2$ using CL $106_2$. As depicted in FIG. 4, port $412_6$ is a unidirectional egress port coupled to a SDH replication multiplexer $430_{1A}$ using a unidirectional communication link (UCL) $414_1$ and port $412_7$ is a unidirectional egress port coupled to a SDH replication multiplexer $430_{2A}$ using a unidirectional communication link (UCL) $414_2$.

As depicted in FIG. 4, ports $412_{14}$, $412_{13}$, $412_{12}$ $412_{11}$, $412_{10}$, and $412_9$ comprise unidirectional ingress ports. The unidirectional ingress ports $412_{14}$, $412_{13}$, and $412_{12}$ are coupled to ports $422_{A0}$, $422_{B0}$, and $422_{C0}$ of second Ethernet switches $230_A$, $230_B$, and $230_C$ using a plurality of unidirectional communication links (UCLs) $424_{1A}$, $424_{1B}$, and $424_{1C}$ (collectively, UCLs $424_1$), respectively. The unidirectional ingress ports $412_{14}$, $412_{13}$, and $412_{12}$ receive upstream traffic from second Ethernet switches $420_A$, $420_B$, and $420_C$, respectively. The unidirectional ingress ports $412_{11}$, $412_{10}$, and $412_9$ are coupled to ports $422_{A2}$, $422_{B2}$, and $422_{C2}$ of second Ethernet switches $420_A$, $420_B$, and $420_C$ using a plurality of unidirectional communication links (UCLs) $424_{2A}$, $424_{2B}$, and $424_{2C}$ (collectively, UCLs $424_2$), respectively.

As depicted in FIG. 4, second Ethernet switches 420 each comprise a plurality of bidirectional ports. With respect to downstream transmissions, second Ethernet switches 420 are configured for forwarding type one traffic (e.g., IPTV service traffic) downstream towards DSLAMs 120. With respect to upstream transmissions, second Ethernet switches 420 are configured for forwarding type two traffic (e.g., IPTV control traffic) upstream towards first Ethernet switch 410. In one embodiment, second Ethernet switches 420 are configured for transmitting and receiving type one traffic and type two traffic using VLAN Port Member Set configuration.

As depicted in FIG. 4, second Ethernet switch $420_A$ comprises a plurality of ports $422_{A0}$-$422_{A11}$ (collectively, ports $422_A$). The second Ethernet switch $420_B$ comprises a plurality of ports $422_{B0}$-$422_{B11}$ (collectively, ports $422_B$). The second Ethernet switch $420_C$ comprises a plurality of ports $422_{C0}$-$422_{C11}$ (collectively, ports $422_C$). The ports $422_A$, $422_B$, and $422_C$ of the second Ethernet switches $420_A$, $420_B$, and $420_C$ are collectively denoted as ports 422. As depicted in FIG. 4, ports $422_{A1}$, $422_{A3}$, $422_{A4}$, $422_{A5}$, $422_{A7}$, $422_{A9}$, $422_{A10}$, and $422_{A11}$ are not configured. As depicted in FIG. 4, ports $422_{B1}$, $422_{B3}$, $422_{B4}$, $422_{B5}$, $422_{B7}$, $422_{B9}$, $422_{B10}$, and $422_{B11}$ are not configured. As depicted in FIG. 4, ports $422_{C1}$, $422_{C3}$, $422_{C4}$, $422_{C5}$, $422_{C7}$, $422_{C9}$, $422_{C10}$, and $422_{C11}$ are not configured.

As depicted in FIG. 4, port $422_{A0}$ is a bidirectional port coupled to SDH replication multiplexer $430_{1A}$ (in the downstream direction) using a unidirectional communication link (UCL) $432_{1A}$ and coupled to a unidirectional ingress port (illustratively, unidirectional ingress port $412_{14}$) of first Ethernet switch 410 (in the upstream direction) using a communication link (CL) $424_{1A}$. As depicted in FIG. 4, port $422_{A2}$ is a bidirectional port coupled to SDH replication multiplexer $430_{2A}$ (in the downstream direction) using a unidirectional communication link (UCL) $432_{2A}$ and coupled to a unidirectional ingress port (illustratively, unidirectional ingress port $412_{11}$) of first Ethernet switch 410 (in the upstream direction) using a communication link (CL) $424_{2A}$. As depicted in FIG. 4, ports $422_{A6}$ and $422_{A8}$ are bidirectional ports coupled to DSLAMs $120_2$ and $120_1$ using CLs $122_2$ and CLs $122_1$, respectively.

As depicted in FIG. 4, port $422_{B0}$ is a bidirectional port coupled to SDH replication multiplexer $430_{1B}$ (in the downstream direction) using a communication link (CL) $432_{1B}$ and coupled to a unidirectional ingress port (illustratively, unidirectional ingress port $412_{13}$) of first Ethernet switch 410 (in the upstream direction) using a communication link (CL) $424_{1B}$. As depicted in FIG. 4, port $422_{B2}$ is a bidirectional port coupled to SDH replication multiplexer $430_{2B}$ (in the downstream direction) using a communication link (CL) $432_{2B}$ and coupled to a unidirectional ingress port (illustratively, unidirectional ingress port $412_{10}$) of first Ethernet switch 410 (in the upstream direction) using a communication link (CL) $424_{2B}$. As depicted in FIG. 4, ports $422_{B6}$ and $422_{B8}$ are bidirectional ports coupled to DSLAMs $120_4$ and $120_3$ using CLs $122_4$ and CLs $122_3$, respectively.

As depicted in FIG. 4, port $422_{C0}$ is a bidirectional port coupled to SDH replication multiplexer $430_{1B}$ (in the downstream direction) using a communication link (CL) $432_{1C}$ and coupled to a unidirectional ingress port (illustratively, unidirectional ingress port $412_{12}$) of first Ethernet switch 410 (in the upstream direction) using a communication link (CL) $424_{1C}$. As depicted in FIG. 4, port $422_{C2}$ is a bidirectional port coupled to SDH replication multiplexer $430_{2B}$ (in the downstream direction) using a communication link (CL) $432_{2C}$ and coupled to a unidirectional ingress port (illustratively, unidirectional ingress port $412_9$) of first Ethernet switch 410 (in the upstream direction) using a communication link (CL) $424_{2C}$. As depicted in FIG. 4, ports $422_{C6}$ and $422_{C8}$ are bidirectional ports coupled to DSLAMs $120_6$ and $120_5$ using CLs $122_6$ and CLs $122_5$, respectively.

In general, CN 110 is configured for transporting type one traffic (e.g., IPTV service traffic) downstream from service providers to end users and transporting type two traffic (e.g., IPTV control traffic) upstream from end users to service providers. With respect to downstream transmission of type one traffic from service providers to end users, first Ethernet switch 410, SDH replication multiplexers 430, and second Ethernet switches 420 are configured for delivering the type one traffic from SPRs 104 to EUTs 130 using associated DSLAMs 120. With respect to upstream transmission of type two traffic from end users to service providers, first Ethernet switch 410 and second Ethernet switches 420 are configured for delivering the type two traffic from EUTs 130 to SPRs 104 using associated DSLAMs 120.

With respect to downstream IPTV service traffic, as depicted in FIG. 4, IPTV service traffic is transmitted from SPRs $104_1$ and $104_2$ to ports $412_0$ and $412_5$ of first Ethernet switch 410, respectively. The port $412_0$ is configured for receiving the IPTV service traffic originating from SPR $104_1$. The first Ethernet switch 410 is configured for switching the IPTV service traffic from port $412_0$ to port $412_6$. The port $412_5$ is configured for receiving the IPTV service traffic originating from SPR $104_2$. The first Ethernet switch 410 is configured for switching the IPTV service traffic from port $412_5$ to port $412_7$. In accordance with the present invention, first Ethernet switch 410 is configured for preventing replication of the IPTV service traffic; rather, IPTV service traffic is replicated further downstream using layer-one replication network elements (illustratively, SDH replication multiplexers 430).

The port $412_6$ is configured for transmitting the IPTV service traffic to SDH replication multiplexer $430_{1A}$. The SDH replication multiplexer $430_{1A}$ replicates the IPTV service traffic (i.e., performs layer-one replication). The SDH replication multiplexer $430_{1A}$ transmits one version of the replicated IPTV service traffic to port $412_{A0}$ using UCL $432_{1A}$. The SDH replication multiplexer $430_{1A}$ transmits another version of the replicated IPTV service traffic to SDH replication multiplexer $430_{1B}$ using a communication link (CL) $434_1$. The SDH replication multiplexer $430_{1B}$ replicates the IPTV service traffic (i.e., performs layer-one replication). The SDH replication multiplexer $430_{1B}$ transmits one version of the replicated IPTV service traffic to port $412_{B0}$ using UCL $432_{1B}$. The SDH replication multiplexer $430_{1B}$ transmits another version of the replicated IPTV service traffic to port $412_{C0}$ using UCL $432_{1C}$.

The port $412_7$ is configured for transmitting the IPTV service traffic to SDH replication multiplexer $430_{2A}$. The SDH replication multiplexer $430_{2A}$ replicates the IPTV service traffic (i.e., performs layer-one replication). The SDH replication multiplexer $430_{2A}$ transmits one version of the replicated IPTV service traffic to port $412_{A2}$ using UCL $432_{2A}$. The SDH replication multiplexer $430_{2A}$ transmits another version of the replicated IPTV service traffic to SDH replication multiplexer $430_{2B}$ using a communication link (CL) $434_2$. The SDH replication multiplexer $430_{2B}$ replicates the IPTV service traffic (i.e., performs layer-one replication). The SDH replication multiplexer $430_{2B}$ transmits one version of the replicated IPTV service traffic to port $412_{B2}$ using UCL $432_{2B}$. The SDH replication multiplexer $430_{2B}$ transmits another version of the replicated IPTV service traffic to port $412_{C2}$ using UCL $432_{2C}$.

As depicted in FIG. 4, ports $422_{A0}$, $422_{B0}$, and $422_{C0}$ and ports $422_{A2}$, $422_{B2}$, and $422_{C2}$ are configured for receiving IPTV service traffic from SDH replication multiplexers $430_{1A}$ and $430_{1B}$ and SDH replication multiplexers $430_{2A}$ and $430_{2B}$, respectively. The second Ethernet switch $420_A$ is configured for switching the IPTV service data between ports $422_{A0}$ and $422_{A2}$ and ports $422_{A6}$ and $422_{A8}$, respectively, according to the destination end user terminal. The second Ethernet switch $420_B$ is configured for switching the IPTV service data between ports $422_{B0}$ and $422_{B2}$ and ports $422_{B6}$ and $422_{B8}$, respectively, according to the destination end user terminal. The third Ethernet switch $420_C$ is configured for switching the IPTV service data between ports $422_{C0}$ and $422_{C2}$ and ports $422_{C6}$ and $422_{C8}$ according to the destination end user terminal.

With respect to upstream IPTV control traffic, as depicted in FIG. 4, IPTV control traffic is transmitted from end user terminals (not depicted with respect to FIG. 4) to associated DSLAMs (illustratively, DSLAMs 120). The IPTV control traffic is transmitted from DSLAMs $120_1$ and $120_2$ to ports $422_{A8}$ and $422_{A6}$ of second Ethernet switch $420_A$, respectively, from DSLAMs $120_3$ and $120_4$ to ports $422_{B8}$ and $422_{B6}$ of second Ethernet switch $420_B$, respectively, and from DSLAMs $120_5$ and $120_6$ to ports $422_{C8}$ and $422_{C6}$ of second Ethernet switch $420_C$, respectively. The second Ethernet switches $420_A$, $420_B$, and $420_C$ are configured for switching the IPTV control traffic between ports $422_{A6}$ and $422_{A8}$ and ports $422_{A0}$ and $422_{A2}$, between ports $422_{B6}$ and $422_{B8}$ and ports $422_{B0}$ and $422_{B2}$, and between ports $422_{C6}$ and $422_{C8}$ and ports $422_{C0}$ and $422_{C2}$, respectively.

As depicted in FIG. 2, ports $422_{A0}$ and $422_{A2}$, ports $422_{B0}$ and $422_{B2}$, and ports $422_{C0}$ and $422_{C2}$ are configured for receiving the IPTV control traffic. The ports $422_{A0}$ and $422_{A2}$, ports $422_{B0}$ and $422_{B2}$, and ports $422_{C0}$ and $422_{C2}$ are configured for transmitting the IPTV control traffic to unidirectional ingress ports $412_{14}$ and $412_{11}$, ports $412_{13}$ and $412_{10}$, and ports $412_{12}$ and $412_9$ using UCLs $424_{1A}$ and $424_{2A}$, UCLs $424_{1B}$ and $424_{2B}$, UCLs $424_{1C}$ and $424_{2C}$, respectively. In accordance with the present invention, second Ethernet switches 420 are configured in a manner for preventing merging of IPTV control traffic; rather, IPTV control traffic is merged further upstream using a layer-two network element (illustratively, first Ethernet switch 410).

As depicted in FIG. 4, ports $412_{14}$ and $412_{11}$, ports $412_{13}$ and $412_{10}$, and ports $412_{12}$ and $412_9$ are configured for receiving the IPTV control traffic from ports $422_{A0}$ and $422_{A2}$, ports $422_{B0}$ and $422_{B2}$, and ports $422_{C0}$ and $422_{C2}$, respectively. The first Ethernet switch 410 is adapted for merging received IPTV control traffic according to the destination service provider router. As depicted in FIG. 4, IPTV control traffic from ports $412_{14}$, $412_{13}$, and $412_{12}$ is merged and switched to port $412_0$ and IPTV control traffic from ports $412_{11}$, $412_{10}$, and $412_9$ is merged and switched to port $412_5$. The ports $412_0$ and $412_5$ are configured for transmitting the merged IPTV control traffic to SPRs $104_1$ and $104_2$ using CLs $106_1$ and $106_2$, respectively. The SPRs $104_1$ and $104_2$ receive and process the received IPTV control traffic.

In one embodiment, type three traffic (e.g., Internet service traffic) is transmitted downstream from SPRs 104 to first Ethernet switch 410. The first Ethernet switch 410 transmits the Internet service traffic to SDH replication multiplexers $430_{1A}$ and $430_{2A}$ using UCLs $414_1$ and $414_2$. The SDH replication multiplexers $430_{1A}$ and $430_{2A}$ transmit the Internet service traffic to second Ethernet switches 420 via SDH replication multiplexers $430_{1B}$ and $430_{2B}$ using UCLs $432_{1A}$-$432_{1C}$ and $432_{2A}$-$432_{2C}$. The second Ethernet switches 420 transmit the Internet service traffic to EUTs 130 using DSLAMs 120. Similarly, in this embodiment, Internet service traffic is transmitted upstream from EUTs 130 to second Ethernet switches 420 using DSLAMs 120. The second Ethernet switches 420 transmit the Internet service traffic upstream to first Ethernet switch 410 using UCLs 424. The first Ethernet switch 410 transmits the Internet service traffic to SPRs 104 using BCLs 106.

As depicted and described herein with respect to FIG. 4, in one embodiment, first Ethernet switch 410 and second Ethernet switches 420 are configured normally (i.e., using a typical IEEE 802.1Q switch configuration), however, downstream and upstream traffic is routed differently through the network. In one such embodiment, downstream IPTV traffic from the service provider networks is transported to a plurality of DSLAMs using multicast connections and upstream IPTV control from the end users is routed to first Ethernet switch 410 which aggregates the upstream unicast connections for transport to the service provider networks.

As described herein, IEEE 802.1Q compliant bridges are configured by defining a plurality of port parameters for each of the ports associated with the bridge (e.g., PVID, member set, untagged set, ingress filtering, and the like). Table 2 depicts the port configurations for first Ethernet switch 210. Although FIG. 4 (and associated Table 2), for purposes of clarity, depicts different connections (using different ports) per service provider, it should be noted that service provider may share connections if the Ethernet frames associated with the shared connections are VLAN tagged where a VLAN identifier identifies the service provider. Furthermore, it should be noted that although specific letters and symbols are used for identifying particular VLAN configuration settings, various other values and value formats may be used for configuring layer-two network elements in accordance with the present invention.

TABLE 2

| Port | Parameter | Configuration 1 | Configuration 2 | Configuration 3 |
|---|---|---|---|---|
| $412_0$ | PVID | x | x | x |
| | Member Set | {x,a} | {x,a} | {x,a,e,f} |
| | Untagged Set | {a (,x)} | {a (,x)} | {a,e,f (,x)} |
| | Ingress Filtering | - (yes) | - (yes) | - (yes) |
| $412_5$ | PVID | y | y | y |
| | Member Set | {y,b} | {y,b} | {y,b,c,d} |
| | Untagged Set | {b (,y)} | {b (,y)} | {b,c,d (,y)} |
| | Ingress Filtering | - (yes) | - (yes) | - (yes) |
| $412_6$ | PVID | - (x) | - (x) | - (x) |
| | Member Set | {x} | {x} | {x} |
| | Untagged Set | {x} ({ }) | {x} ({ }) | {x} ({ }) |
| | Ingress Filtering | - (yes) | - (yes) | - (yes) |
| $412_7$ | PVID | - (y) | - (y) | - (y) |
| | Member Set | {y} | {y} | {y} |
| | Untagged Set | {y} ({ }) | {y} ({ }) | {y} ({ }) |
| | Ingress Filtering | - (yes) | - (yes) | - (yes) |
| $412_9$ | PVID | b | b | b |
| | Member Set | {b} | { } | {b} |
| | Untagged Set | { } | { } | { } |
| | Ingress Filtering | - (yes) | no | - (yes) |
| $412_{10}$ | PVID | b | b | c |
| | Member Set | {b} | { } | {c} |
| | Untagged Set | { } | { } | { } |
| | Ingress Filtering | - (yes) | no | - (yes) |
| $412_{11}$ | PVID | b | b | d |
| | Member Set | {b} | { } | {d} |
| | Untagged Set | { } | { } | { } |
| | Ingress Filtering | - (yes) | no | - (yes) |
| $412_{12}$ | PVID | a | a | a |
| | Member Set | {a} | { } | {a} |
| | Untagged Set | { } | { } | { } |
| | Ingress Filtering | - (yes) | no | - (yes) |
| $412_{13}$ | PVID | a | a | e |
| | Member Set | {a} | { } | {e} |
| | Untagged Set | { } | { } | { } |
| | Ingress Filtering | - (yes) | no | - (yes) |
| $412_{14}$ | PVID | a | a | f |
| | Member Set | {a} | { } | {f} |
| | Untagged Set | { } | { } | { } |
| | Ingress Filtering | - (yes) | no | - (yes) |

As depicted in Table 2, PVID=x corresponds to frames associated with the first service provider (i.e., SPR $104_1$) and PVID=y corresponds to frames associated with the second service provider (i.e., SPR $104_2$). As depicted in Table 2 (Configuration 1 and Configuration 2), PVID=b corresponds to frames received by ports $412_9$, $412_{10}$, and $412_{11}$, and merged for transmission towards the first service provider (i.e., SPR $104_1$) and PVID=a corresponds to frames received by ports $412_{12}$, $412_{13}$, and $412_{14}$ and merged for transmission towards the second service provider (i.e., SPR $104_2$). Note that PVID=a and PVID=b are internal to the transport network and are not externally visible outside of CN 110.

As depicted in Table 2 (Configuration 3), PVIDs equal to b, c, d, a, e, and f correspond to frames received by ports $412_9$, $412_{10}$, $412_{11}$, $412_{12}$, $412_{13}$, and $412_{14}$, respectively. In one embodiment, in which the first and second service providers (and, optionally, other service providers not depicted) share a connection, the Untagged Set parameter should be empty (i.e., { }) for ports $412_6$ and $412_7$ if the frames are sent tagged.

As depicted in Table 2, placing PVID=a and PVID=b in the Untagged Set on ports $412_0$ and $412_5$ enables the associated service provider router to receive traffic in a format that the respective service provider router expects.

Figure 5:
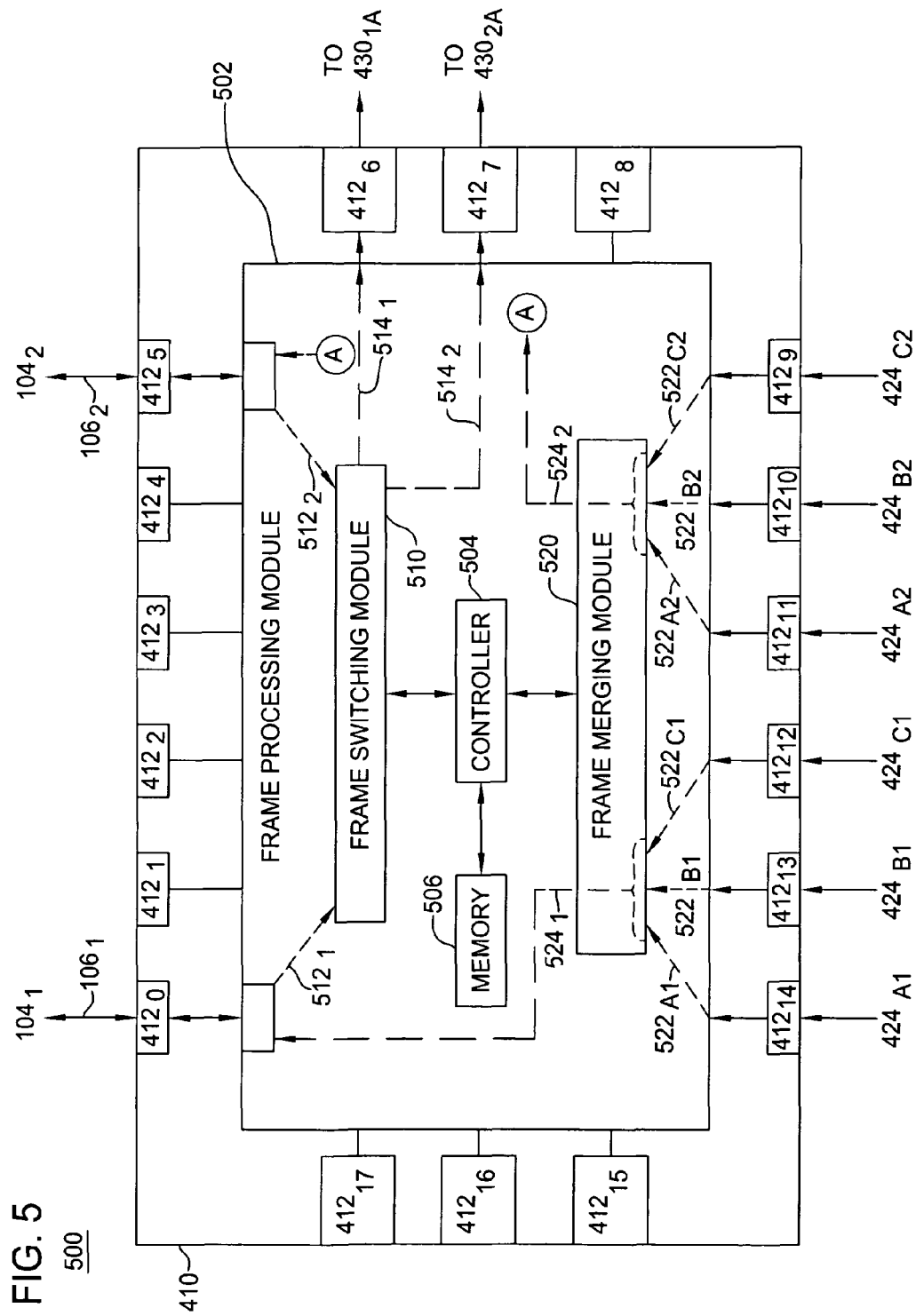
FIG. 5 depicts a high-level block diagram of one embodiment of the hub switch of the communication network of FIG. 4.

FIG. 5 depicts a high-level block diagram of one embodiment of the hub switch (i.e, Ethernet switch 410) of the communication network of FIG. 4. As depicted in FIG. 5, Ethernet switch 410 comprises a frame processing module 502 coupled to each of ports 412 depicted and described with respect to FIG. 4. As depicted in FIG. 5, directionality of ports $412_1$-$412_4$, $412_8$, and $412_{15}$-$412_{17}$ is not indicated since each port may be configured for supporting unidirectional ingress communications, unidirectional egress communications, or bidirectional communications. As depicted in FIG. 5, frame processing module 502 includes a frame switching module 510 and a frame merging module 520.

As depicted in FIG. 5, frame processing module 502 includes a controller 504 having an associated memory 506. In one embodiment, controller 504 is operable for configuring and controlling ports 412. In one embodiment, at least one other controller (not depicted) associated with Ethernet switch 410 may provide configuration and control of at least a portion of the functions of ports 412. In one embodiment, controller 504 communicates with memory 506 for providing at least a portion of the traffic switching functions of the present invention. Although depicted and described as comprising separate modules within frame processing module 502, in one embodiment, frame switching functions of frame switching module 510 and frame merging functions of frame merging module 520 may be implemented using a single Ethernet switching stage.

As depicted in FIG. 5, controller 504 is coupled to frame switching module 510 for controlling frame switching functions of Ethernet switch 410. The frame switching module 510 switches downstream traffic as downstream traffic streams $512_1$ and $512_2$ from SPRs $104_1$ and $104_2$ via bidirectional ports $412_0$ and $412_5$, respectively. The frame switching module 510 transmits the switched downstream traffic streams $514_1$ and $514_2$ towards SDH replication multiplexers $430_{1A}$ and $430_{2A}$ via unidirectional egress ports $412_6$ and $412_7$, respectively. Although not depicted, in one embodiment, frame merging module 520 may be coupled to frame switching module 510 such that frame switching module 510 switches merged traffic streams produced by frame merging module 520 towards corresponding service provider routers (e.g., towards SPRs $104_1$ and $104_2$ via ports $412_0$ and $412_5$, respectively).

As depicted in FIG. 5, controller 504 is coupled to frame merging module 520 for controlling frame merging functions of Ethernet switch 410. The frame merging module 510 merges upstream traffic received on ports 412. In one embodiment, frame merging module 520 merges upstream traffic received on ports 412 according to the intended service provider router. As depicted in FIG. 5, frame merging module 520 merges IPTV control traffic streams $522_{A1}$, $522_{B1}$, and $522_{C1}$ received on ports $412_{14}$, $412_{13}$, and $412_{12}$, respectively, to form a first merged traffic stream $524_1$ which is routed to SPR $104_1$ via bidirectional port $412_0$. As depicted in FIG. 5, frame merging module 520 merges IPTV control traffic streams $522_{A2}$, $522_{B2}$, and $522_{C2}$ received on ports $412_{11}$, $412_{10}$, and $412_9$, respectively, to form a second merged traffic stream $524_2$ which is routed to SPR $104_2$ via bidirectional port $412_5$.

Although depicted and described herein with respect to specific network types, network configurations, network elements, network protocols, and the like, in one embodiment, various other network types, network configurations, network elements, network protocols may be used in accordance with the present invention. For example, the present invention may be implemented using different numbers of Ethernet hub switches and Ethernet spoke switches. Similarly, for example, the present invention may be implemented using a different Ethernet network topology. For example, the present invention may be implemented using SONET replication multiplexers in place of SDH replication multiplexers.

With respect to configuration and functionality, the network elements of CN 110 may be denoted as different node types. The SDH replication multiplexers 240 of FIG. 2 and FIG. 3 and SDH replication multiplexers 430 of FIG. 4 and FIG. 5 may be denoted as type one nodes adapted for replicating data at a first network layer. The second Ethernet switch 220 of FIG. 2 and FIG. 3 and first Ethernet switch 410 of FIG. 4 and FIG. 5 may be denoted as type two nodes configured and adapted for merging data at a second network layer. The SPRs 104 of FIG. 2 and FIG. 4 may be denoted as type three nodes adapted for transmitting type one traffic in a downstream direction and receiving type two traffic in an upstream direction. The first Ethernet switch 210 of FIG. 2 and FIG. 3 may be denoted a type four node adapted for forwarding type one traffic towards type three nodes and receiving merged type two traffic and forwarding the merged type two traffic towards type five nodes. The third Ethernet switches 230 of FIG. 2 and the second Ethernet switches 420 of FIG. 4 may be denoted as type five nodes adapted for receiving replicated type one traffic from type one nodes and transmitting type two traffic towards a type two node operable for merging the type two traffic. The network elements are not intended to be limited by the functions ascribed thereto through use of node-type designators.

As such, differences between the two-hub configuration depicted and described with respect to FIG. 2 and FIG. 3 and the one-hub configuration depicted and described with respect to FIG. 4 and FIG. 5 represent a trade-off between capital expenditure considerations and operational expenditure considerations. Specifically, the two-hub configuration depicted and described with respect to FIG. 2 and FIG. 3 requires additional capital expenditure (e.g., additional Ethernet switch resources, such as cards) while providing operational expenditure savings (e.g., simpler VLAN configuration) over the one-hub configuration depicted and described with respect to FIG. 4 and FIG. 5. Conversely, the one-hub configuration depicted and described with respect to FIG. 4 and FIG. 5 requires additional operational expenditure (e.g., more complex, non-standard VLAN configuration) while providing capital expenditure savings (e.g., less Ethernet switch resources) over the two-hub configuration depicted and described with respect to FIG. 2 and FIG. 3.

Furthermore, it should be noted that although the one-hub configuration depicted and described with respect to FIG. 4 and FIG. 5 requires a more complex, non-standard VLAN configuration than the two-hub configuration depicted and described with respect to FIG. 2 and FIG. 3, the number of circuits required to be provisioned and maintained in the one-hub configuration depicted and described with respect to FIG. 4 and FIG. 5 is less than the number of circuits required to be provisioned and maintained in the two-hub configuration depicted and described with respect to FIG. 2 and FIG. 3. As such, in some embodiments, operational expenditure may be similar for both the one-hub and two-hub configurations, thereby causing the one-hub and two-hub configurations to be distinguishable using a capital expenditure analysis. It should be noted that both configurations provide substantial benefits over existing network configurations.

Although various embodiments which incorporate the teachings of the present invention have been shown and described in detail herein, those skilled in the art can readily devise many other varied embodiments that still incorporate these teachings.

What is claimed is:

1. A network element, comprising:
a plurality of first bidirectional ports configured to:
broadcast downstream traffic towards a plurality of network elements adapted for replicating the downstream traffic at a first network layer comprising a combination of a physical layer and a portion of a data link layer; and
receive upstream traffic from another network element, wherein the received upstream traffic have been merged by the another network element at a second network layer according to one or more intended destinations associated with the upstream traffic upon receiving the upstream traffic from a plurality of other network elements, the second network layer comprises a combination of layers, and
wherein the first network layer differs from the second network layer.

2. The network element of claim 1, further comprising:
a plurality of second bidirectional ports configured to:
receive the downstream traffic for providing the downstream traffic toward the plurality of first bidirectional ports; and
transmit the upstream traffic received by the plurality of first bidirectional ports toward the one or more intended destinations.

3. The network element of claim 1, wherein the one or more intended destinations identify at least one router adapted for transmitting the downstream traffic and receiving the upstream traffic.

4. The network element of claim 1, wherein the downstream traffic comprises Internet Protocol television (IPTV) service traffic and the upstream traffic comprises IPTV control traffic.

5. The network element of claim 4, wherein the plurality of first bidirectional ports is further configured to:
receive at the first network layer, from the another network element, Internet service traffic along with IPTV service traffic; and
transmit at the second network layer, toward the plurality of the network elements, other Internet service traffic along with the IPTV control traffic.

6. The network element of claim 1, wherein the first network layer comprises an Open Systems Interconnection (OSI) Reference Model physical layer.

7. The network element of claim 1, wherein:
the network element and another network element are hub Ethernet switches; and
the plurality of other network elements are spoke Ethernet switches.

8. The network element of claim 1, wherein the second network layer comprises an Open Systems Interconnection (OSI) Reference Model data link layer.

9. The network element of claim 1, wherein the plurality of network elements are replication multiplexers.

10. A network element, comprising:
a plurality of unidirectional ingress ports;
a plurality of unidirectional egress ports; and
a merging unit in communication with the plurality of unidirectional ingress ports and the plurality of unidirectional egress ports, wherein:

each of the plurality of unidirectional ingress ports is configured to receive upstream traffic;

the merging unit is configured to merge the upstream traffic received by the plurality of unidirectional ingress ports at a first network layer according to one or more intended destinations associated with the upstream traffic, the network layer comprises a combination of a physical layer and a portion of a data link layer; and each of the plurality of unidirectional egress ports is configured to transmit the merged upstream traffic toward another network element, the another network element configured to broadcast downstream traffic toward a plurality of network elements adapted for replicating of the downstream traffic at a second network layer, the second network layer comprises a combination of layers;

wherein the first network layer and the second network layer are different.

11. The network element of claim 10, wherein the network element and the another network element are Ethernet switches and the plurality of network elements are multiplexers.

12. The network element of claim 10, wherein the another network element comprises:
a plurality of first bidirectional ports configured to:
broadcast the downstream traffic towards the plurality of network elements adapted for replicating of the downstream traffic at the second network layer, and
receive the upstream traffic from the plurality of unidirectional egress ports.

13. The network element of claim 12, wherein the another network element further comprises:
a plurality of second bidirectional ports configured to:
receive the downstream traffic for providing the downstream traffic toward the plurality of first bidirectional ports; and
transmit the upstream traffic received by the plurality of first bidirectional ports toward the one or more intended destinations.

14. The network element of claim 10, wherein:
the plurality of unidirectional ingress ports is further configured to receive another type traffic along with the upstream traffic;
the merging unit is further adapted to merge the another type traffic; and
the plurality of unidirectional egress ports is further configured to transmit the merged another type traffic toward the another network element.

15. A network element, comprising:
a plurality of unidirectional egress ports configured to broadcast downstream traffic toward a plurality of network elements adapted for replicating of the downstream traffic at a first network layer comprising a combination of a physical layer and a portion of a data link layer;
a plurality of unidirectional ingress ports configured to receive upstream traffic from a plurality of other network elements; and
a merging unit in communication with the plurality of unidirectional ingress ports, the merging unit configured to merge the upstream traffic received by the plurality of unidirectional ingress ports at a second network layer according to one or more intended destinations associated with the upstream traffic, the second network layer comprises a combination of layers;
wherein the first network layer differs from the second network layer.

16. The network element of claim 15, wherein the network element and the plurality of other network elements are Ethernet switches and the network elements are multiplexers.

17. The network element of claim 15, wherein the downstream traffic comprises Internet Protocol television (IPTV) service traffic and the upstream traffic comprises IPTV control traffic.

18. The network element of claim 17, wherein each of the plurality of other network elements comprises:
a plurality of first bidirectional ports configured to:
receive the downstream traffic from one or more of the plurality of the network elements; and
transmit the upstream traffic toward the plurality of unidirectional ingress ports.

19. The network element of claim 15, further comprising:
a plurality of bidirectional ports configured to:
receive the downstream traffic from one or more network element identified by the one or more destinations; and
transmit the upstream traffic toward the one or more network elements identified by the one or more destinations; and
a switching unit in communication with the plurality of bidirectional ports for switching the downstream traffic received from the plurality of bidirectional ports to the plurality of unidirectional egress ports.

20. The network element of claim 15, wherein:
the plurality of unidirectional egress ports is further configured to transmit another type traffic towards the plurality of network elements;
each of the plurality of unidirectional ingress ports is further configured to receive the another type traffic from the plurality of other network elements; and
the merging unit is adapted for merging the another type traffic.

21. The network element of claim 15, wherein the first network layer comprises an Open Systems Interconnection (OSI) Reference Model physical layer.

22. The network element of claim 15, wherein the second network layer comprises an Open Systems Interconnection (OSI) Reference Model data link layer.

23. The network element of claim 15, wherein at least a portion of the downstream traffic is adapted for controlling at least a portion of the upstream traffic.

24. A network element, comprising:
a plurality of bidirectional ports configured to:
transmit upstream traffic toward a plurality of ports of another network element, the another network element configured to merge the upstream traffic at a first network layer according to one or more intended destinations associated with the upstream traffic, the network layer comprises a combination of a physical layer and a portion of a data link layer; and
receive downstream traffic from a plurality of network elements after the downstream traffic have been replicated by the plurality of network elements at a second network layer, the second network layer comprises a combination of layers;
wherein the first network layer differs from the second network layer.

* * * * *